United States Patent
Chaieb et al.

(10) Patent No.: US 10,508,040 B2
(45) Date of Patent: Dec. 17, 2019

(54) METHODS OF MAKING SILICA NANOPARTICLES, PROPELLANTS, AND SAFETY DEVICES

(71) Applicant: King Abdullah University of Science and Technology, Thuwal (SA)

(72) Inventors: Sahraoui Chaieb, Thuwal (SA); Jehad El-Demellawi, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 16/072,440

(22) PCT Filed: Jan. 25, 2017

(86) PCT No.: PCT/IB2017/050390
§ 371 (c)(1),
(2) Date: Jul. 24, 2018

(87) PCT Pub. No.: WO2017/130115
PCT Pub. Date: Aug. 3, 2017

(65) Prior Publication Data
US 2019/0031517 A1 Jan. 31, 2019

Related U.S. Application Data

(60) Provisional application No. 62/286,472, filed on Jan. 25, 2016.

(51) Int. Cl.
*C01B 33/12* (2006.01)
*C06B 33/04* (2006.01)
(Continued)

(52) U.S. Cl.
CPC ............ *C01B 33/124* (2013.01); *C06B 33/04* (2013.01); *C06B 45/02* (2013.01); *C06B 47/04* (2013.01);
(Continued)

(58) Field of Classification Search
CPC ....... C01B 33/124; C06B 33/04; C06B 45/02; C06B 47/04
See application file for complete search history.

(56) References Cited

U.S. PATENT DOCUMENTS 7,560,085 B2 * 7/2009 Farrell .................... C01B 33/02
423/348
2003/0190276 A1 10/2003 Unehara et al.
(Continued)

FOREIGN PATENT DOCUMENTS

DE 19949776 A1 4/2001

OTHER PUBLICATIONS

Asuha et al (Nitric acid oxidation of silicon at ~120° C. to form 3.5-nm SiO2/Si structure with good electrical characteristics, Appl. Phys. Lett. 85, 3783 (2004)) (Year: 2004).*
(Continued)

*Primary Examiner* — Melvin C. Mayes
*Assistant Examiner* — Michael Forrest
(74) *Attorney, Agent, or Firm* — Billion & Armitage; Lisbeth C. Robinson

(57) ABSTRACT

The present disclosure provides for silicon nanoparticles, safety devices, solid propellants, and the like.

16 Claims, 8 Drawing Sheets

(51) Int. Cl.
*C06B 45/02* (2006.01)
*C06B 47/04* (2006.01)

(52) U.S. Cl.
CPC ...... *C01P 2002/02* (2013.01); *C01P 2004/04* (2013.01); *C01P 2004/32* (2013.01); *C01P 2004/64* (2013.01); *C01P 2006/16* (2013.01)

(56) References Cited

U.S. PATENT DOCUMENTS

| | | |
|---|---|---|
| 2004/0244889 A1* | 12/2004 | Sailor ................ C06B 33/00 149/2 |
| 2008/0138270 A1 | 6/2008 | Li et al. |
| 2011/0123620 A1* | 5/2011 | Weigandt ............ A61K 9/0019 424/484 |
| 2013/0092865 A1 | 4/2013 | Carlson et al. |
| 2015/0353458 A1 | 12/2015 | Chaieb et al. |

OTHER PUBLICATIONS

McCord et al (Chemiluminescence of Anodized and Etched Silicon: Evidence for a Luminescent Siloxene-Like Layer on Porous Silicon, Science. vol. 257, 5066, (1992) pp. 68-69) (Year: 1992).*
PCT International Search Report and Written Opinion for PCT/IB/US2017/050390 dated Apr. 6, 2017.

* cited by examiner

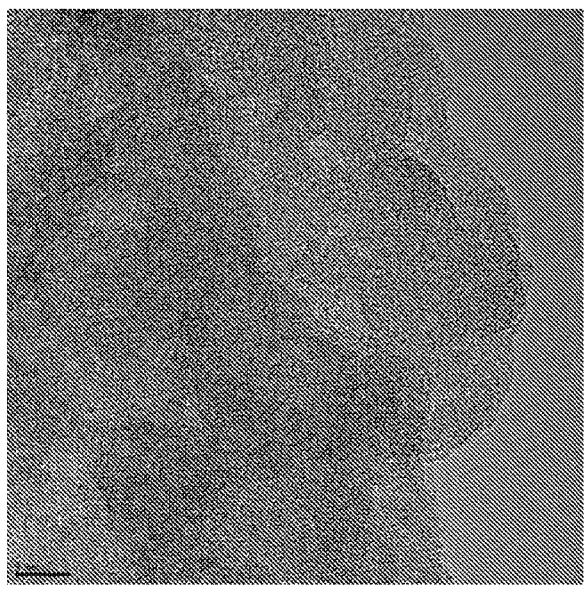 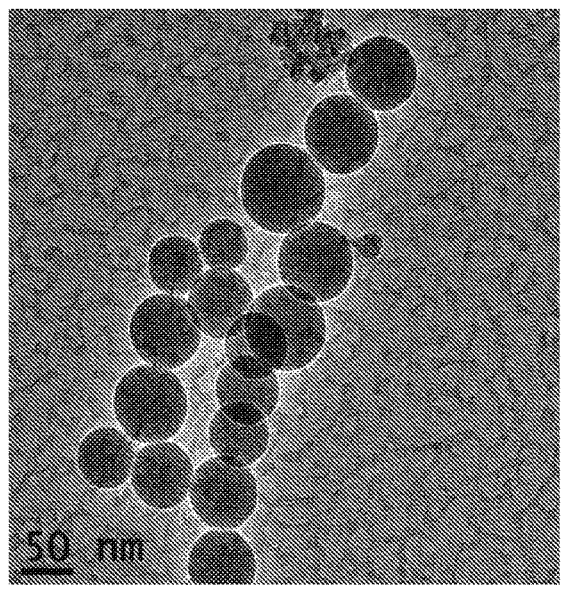
Fig. 4A                    Fig. 4B

METHODS OF MAKING SILICA NANOPARTICLES, PROPELLANTS, AND SAFETY DEVICES

CROSS-REFERENCE TO RELATED APPLICATIONS

This application claims the benefit of and priority to U.S. Provisional Application Ser. No. 62/286,472, having the title "METHODS OF MAKING SILICA NANOPARTICLES, PROPELLANTS, AND SAFETY DEVICES," filed on Jan. 25, 2016, the disclosure of which is incorporated herein in by reference in its entirety.

BACKGROUND

There are several existing methods for preparing nanoparticles, including by hydrolysis of TEOS in ethanol or sol-gels. Such methods can be very costly and require expensive equipment and heavy machinery. There is a need for less expensive and simpler methods to prepare nanoparticles.

SUMMARY

Embodiments of the present disclosure provide methods of making silica particles, structures including silicon particles and nitric acid, solid propellants including silicon particles and nitric acid, and the like.

An embodiment of the present disclosure includes a method of making silica particles, among others, which includes: mixing nitric acid with porous silicon particles in an environment, wherein the colloidal porous silicon particles are irregularly shaped; and forming spherical non-aggregated silica particles. In an embodiment, the spherical non-aggregated silica particles are spherical non-aggregated silica particles having a diameter of about 20 to 100 nm. In an embodiment, the spherical non-aggregated silica nanoparticles can be porous. The method can also include: removing a layer of porous silicon from a substrate using a first ultrasound energy to form a first plurality of colloidal porous silicon particles in suspension; exposing the first plurality of porous silicon particles to a second ultrasound energy to form a second plurality of porous silicon particles in suspension, wherein the second plurality of colloidal porous silicon particles are in the amorphous phase; and drying the porous silicon particles.

An embodiment of the present disclosure includes a structure, among others, which includes: a spherical non-aggregated silica nanoparticles produced using the method of the present disclosure. In an embodiment, the spherical non-aggregated silica nanoparticles can be loaded with one or more agents such as a drug.

An embodiment of the present disclosure includes a structure, among others, which includes: a plurality of porous silicon particles and nitric acid, wherein the plurality of porous silicon particles and the nitric acid are separated from one another in a separating structure, wherein the separating structure is capable of being broken so that the nitric acid and the plurality of porous silicon particles come into contact with one another upon application of a force.

An embodiment of the present disclosure includes a solid propellant, among others, which includes: a plurality of porous silicon particles and nitric acid, wherein the plurality of porous silicon particles and the nitric acid are separated until energy is required for propulsion, whereupon mixing of the plurality of porous silicon particles and the nitric acid produces energy for propulsion.

Other structure, methods, features, and advantages will be or become apparent to one with skill in the art upon examination of the following drawings and detailed description. It is intended that all such additional structures, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

FIGS. 4A-B are high-resolution TEM (HRTEM) micrographs for as-prepared amorphous silicon nanostructures (FIG. 4A) and the produced amorphous silica nanoparticles (FIG. 4B).

DETAILED DESCRIPTION

Figure 1A:
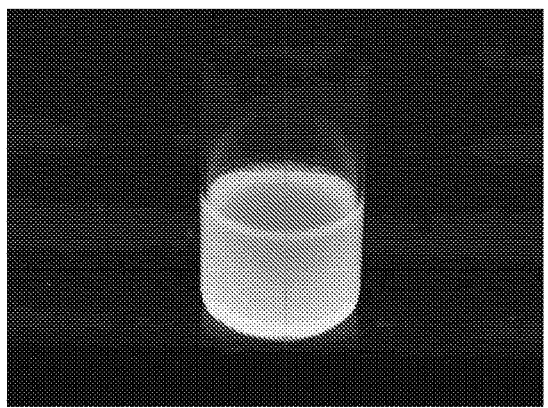
FIG. 1A is an image of a colloidal solution of amorphous silicon nanostructures under UV illumination (365 nm).
Figure 1B:
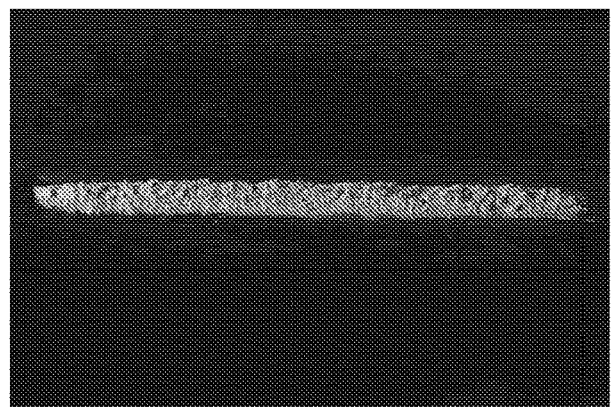
FIG. 1B is an image of dried amorphous silicon nanostructures.

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Embodiments of the present disclosure will employ, unless otherwise indicated, techniques of material science, chemistry, physics, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Embodiments of the present disclosure provide for making silicon nanoparticles (spherical non-aggregated silica particles), safety devices, solid propellants, and the like. An embodiment for making spherical non-aggregated silica particles can be advantageous for at least the reason of cost and simplicity as compared to other commercial methods. Silica particles are usually obtained by hydrolysis of tetraethyl orthosilicate (TEOS) in ethanol. Current methods used to prepare silica nanoparticles include high-temperature oxidation of hexamethyldisiloxane (HMDSO) vapor in an aerosol co-flow diffusion flame reactor, which is a very costly method. Sol-gel methods are also used through hydrolysis and condensation reactions of tetraethylortho-silicate (TEOS) as precursor of silica using hydrochloric acid (HCl) and ammonia ($NH_3$). These methods necessitate heavy machinery and elaborate designs and draconian safety measures that are costly.

An embodiment of the present disclosure includes methods of making spherical non-aggregated silica particles. Porous silicon nanoparticles (those made using ultrasound as described below, as opposed to those formed from the method) can be mixed with nitric acid in a controlled environment to form spherical non-aggregated silica particles. In an embodiment, the oxygen content in the environment can be controlled (e.g., up to about 0.5-2.0 ppm of oxygen can be present), which can be used to control the rate of reaction, the dimensions of the formed silica nanoparticles, and the like.

In regard to the porous silicon particle (not the spherical non-aggregated silica particles, and referred to as first plurality of porous silicon particles herein), the porous silicon particle can be made by removing a layer of porous silicon from a substrate using ultrasound, for example. In an embodiment, the layer of porous silicon on the substrate can be formed using techniques such as anodization or wet chemical etching. In an embodiment, the layer of porous silicon can be modified and/or doped.

In an embodiment, the thickness of the layer of porous silicon on the substrate can be about 1 to 10 μm. In an embodiment, the layer of porous silicon can be mesoporous (e.g., where the channel has a diameter of about 1000 μm or larger), microporous (e.g., where the channel has a diameter of about 1 μm to about 1000 μm), and/or nanoporous (e.g., where the channel has a diameter of about 1 nm to about 1000 nm). In an embodiment, the layer of porous silicon can include one or more types of pores (e.g., mesoporous, microporous, and/or nanoporous). In an embodiment, the channels can extend into the layer of porous silicon from about 1× to 100,000× the diameter of the channels. In an embodiment, the channels can be straight, curvy, serpentine, or the like and can optionally include branches into multiple channels or can connect with other channels. In an embodiment, the surface of the mesoporous channels can include microporous channels and/or nanoporous channels. In an embodiment, the surface of the microporous channels can include nanoporous channels.

In an embodiment, a first ultrasound energy (e.g. 45 kHz frequency 60 W to 240 W peak power) can be used to form a first plurality of porous silicon particles in suspension. In an embodiment, the ultrasonic energy causes a portion of the layer of porous silicon to detach from the substrate. The size of the porous silicon particles can be about 1 μm to 10 μm. Subsequently, the substrate is removed from the first plurality of porous silicon particles (or the first plurality of porous silicon particles are removed from the substrate) and can be subjected to one or more additional exposures to ultrasound energy (e.g. 20 kHz 50 W to 500 W frequency) to further reduce the size of the porous silicon particles (second plurality of porous silicon particles), such as to the dimensions described above (e.g., about 100 nanometers to 10 micrometers). In an embodiment, the concentration of the porous silicon particles in the colloidal photoluminescent porous silicon particle suspension can be adjusted to the desired level for a particular application.

In an embodiment, the substrate, the first plurality of porous silicon particles, and/or the second plurality of porous silicon particles, can be in a solution that includes the desired solvent or can be included in a different solution. When the second plurality of porous silicon particles are formed in a solution other than the desired solvent, the second plurality of porous silicon particles can be disposed in the desired solvent.

In an embodiment, the ultrasound energy can be formed using an ultrasonic horn, bath sonicator, or ultrasonic transducer. In an embodiment, the power used to detach the layer of porous silicon from the substrate is about 50 W to 500 W and is applied over a time frame of 30 seconds to 4 hours at room temperature and pressure. In an embodiment, the power used to reduce the size of the first plurality of porous silicon particles is about 60 W to 240 W and is applied over a time frame of about 1 minute to 1 hour at room temperature and pressure.

In an embodiment, the porous silicon particles (e.g., first plurality of porous silicon particles and/or the second plurality of porous silicon particles) have a longest dimension of about 100 nanometers to 10 micrometers, about 100 nm to 1 µm, or about 100 nm to 500 nm. In an embodiment, the porous silicon particles are irregularly shaped. In an embodiment, the porous silicon particles can be sorted so that the particular population are similar in size and/or shape. In an embodiment, the ultrasonic energy can be selected and applied for a time period to obtain porous silicon particles having a desired shape and/or diameter.

Once the colloidal porous silicon particle suspension (e.g., the first plurality of porous silicon particles and/or the second plurality of porous silicon particles) is made, the porous silicon particle can be separated from the solvent via evaporation or similar technique. The dried porous silicon particles can then be exposed to (e.g., mixed with) nitric acid (e.g., about 70% or less concentration of nitric acid can be used), where the concentration of the nitric acid can be adjusted as needed. The ratio of the amount of porous silicon particles to nitric acid can be about 10000:1 to 5000:1. Addition of nitric acid to a portion of the porous silicon particles yields a spontaneous vigorous explosion that self-propagates to the entire amount quantity of porous silicon particles. The velocity of the moving front of the reaction can be about 1 to 5 cm/sec or about 3 cm/sec.

In an embodiment, the reaction can produce spherical non-aggregated silica particles (e.g., spherical non-aggregated silica nanoparticles), where the spherical non-aggregated silica particles can optionally be porous. As discussed above, the amount of oxygen present can be used to control the dimensions of the formed spherical non-aggregated silica particles. In an embodiment, the spherical non-aggregated silica particles can have a diameter about 10 nm to 100 µm. In an embodiment, the spherical non-aggregated silica nanoparticles can have a diameter of about 10 to 100 nm and a mean diameter of about 40 to 60 nm or about 20 to 100 nm and a mean diameter of about 50 nm. Optionally, the formed spherical non-aggregated silica particles can be porous (e.g., mesoporous, microporous, and/or nanoporous similar to that described in regard to the layer of porous silicon but for the spherical non-aggregated silica particles formed from the applied method).

In an embodiment, having a mesoporous structure for the produced silica particles along with reduced porosity (close to nonporous) can make it considered as a double-functional material in some applications such as drug or biomedical applications. Not only can it be used in the delivery of an agent (e.g. chemical, biochemical, drug, antimicrobial, fertilizer, and the like) based on chemical or physical adsorption (because of its porous structure), it can be also in agent delivery through encapsulation (because of the highly-reduced porosity). As a result, embodiments of the present disclosure can include porous silica particles (formed via methods described herein as opposed to the starting component) that are loaded with one or more types of agents, where the agents can be loaded in and/or on porous silica particles through chemical or physical adsorption and encapsulation. In an embodiment, the porous silica particles can be designed to deliver the agent(s) at different times based on the double-functionality (two ways to load the agent) of the porous silica particles.

Another embodiment of the present disclosure includes a structure such as a security device. The security device can be used in situations where the item that is being protected by the security device is destroyed or rendered useless upon disruption of the security device or in other situations to scare the person away from the item. For example, if the security device is disrupted, the security device produces an explosion and exothermic reaction where the explosion and/or heat from the reaction destroy or render the item useless.

In an embodiment, the structure includes the plurality of porous silicon particles (e.g., those produced from the ultrasonic method described herein) and nitric acid, where the plurality of porous silicon particles and the nitric acid are separated from one another in a separating structure. The separating structure is capable of being broken so that the nitric acid and the plurality of porous silicon particles come into contact with one another upon application of a force to break the separating structure. The separating structure has dimensions (e.g., thickness), strength, and/or another characteristic that breaks upon application of a force above a certain value. The type of separating structure used, the amount of force needed to be applied to break the separating structure, and the like can be selected in the design of the structure so that it is appropriate for the item to be protected. In this regard, these features can vary based on the particular application. In an embodiment, the separating structure can be a membrane made of a polymer, glass, thin plastic, porous material such as MOFs, or a material that has a very low shear modulus.

In an embodiment, the security device can include a computer lock, an ultrasensitive flash drive that is locked, an electronic device that can be destroyed in case of toiling with it, or a device that needs a sealant that would self-detonate in the case of the sealant being broken.

In another embodiment the present disclosure provides for a solid propellant that can be used in rockets, ammunition, small self-propelled rockets for space applications, and the like. An embodiment of the solid propellant includes the plurality of porous silicon particles (e.g., such as those produced using ultrasound as described herein) and nitric acid, where the plurality of porous silicon particles and the nitric acid are separated by a propellant separating structure until energy is required for propulsion. When propulsion is needed, the plurality of porous silicon particles and the nitric acid are mixed to produce energy for propulsion. The propellant separating structure can include a semi-permeable membrane or a super thin film that would break when a fuse, for example, is activated. The fuse might burn releasing the nitric acid or any similar oxidant that would react with the porous materials provoking the propulsion. In an embodiment, the solid propellant can be positioned relative to the structure to have the force applied to. The amount of solid propellant used can depend upon the structure to apply the force to, the velocity of the desired structure, and the like, for example a small device that would need to be propelled in a low drag environment such as space.

EXAMPLES

Figure 2:
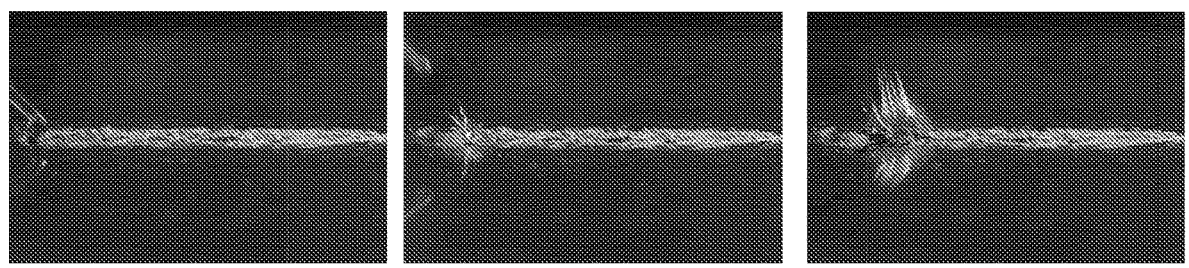
FIG. 2 illustrates (left to right) the self-propagating explosion upon adding one drop $HNO_3$ on a line of heaped amorphous silicon nanostructures powder.
Figure 3:
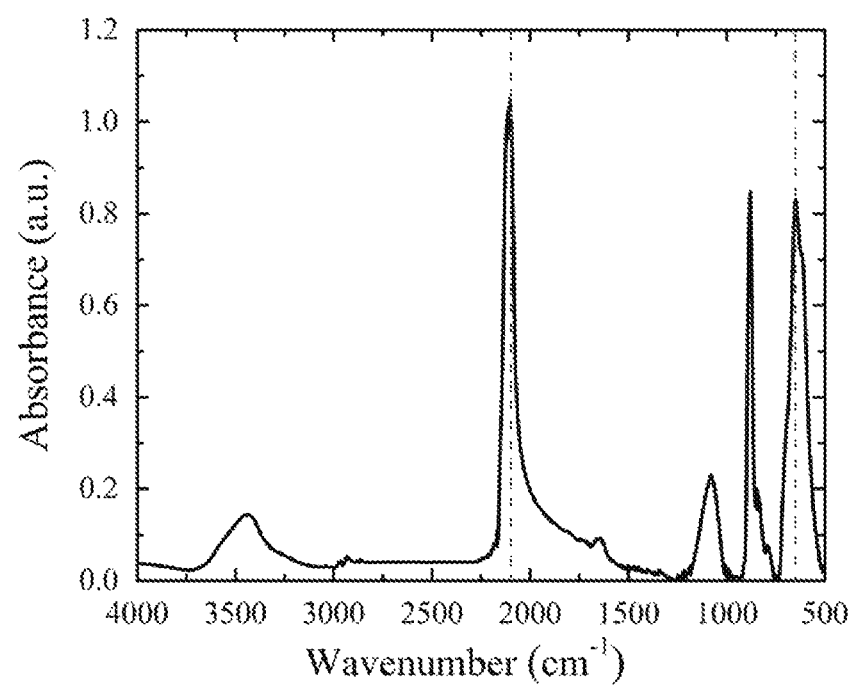
FIG. 3 is a plot of the infrared spectrum of the as-prepared powder made of amorphous silicon nanostructures. Notice the large peak at 2100 $cm^{-1}$ representative of Si—H stretching mode and the peak at 640 $cm^{-1}$ representative of Si—H wagging mode and they are both much larger than the presented Si—O—Si due to air-exposure. This illustrates that the surface of the silicon powder is hydrogen passivated.

This example describes methods to create energetic materials that can be used as a solid propellant or as a safety structure or device as well as a method to produce spherical amorphous silica (silicon dioxide) nanoparticles. In general, amorphous silicon nanostructures can be produced using combustion/explosion process. This was achieved by adding a tiny drop of nitric acid ($HNO_3$) greater than about 1 μl on the side of a dried amount of amorphous silicon nanostructures, which yields a spontaneous vigorous explosion that self-propagates to the entire amount away from the added drop of nitric acid (see FIG. 2). The velocity of the moving front is about 3 cm/sec. The whole reaction takes a place in a minimum-oxygen content environment as shown from the FT-IR spectrum of the amorphous silicon nanostructure (see FIG. 3). Most of the experiments were performed in controlled atmosphere flushed with Argon, so the amount of oxygen can be controlled.

Figure 5:
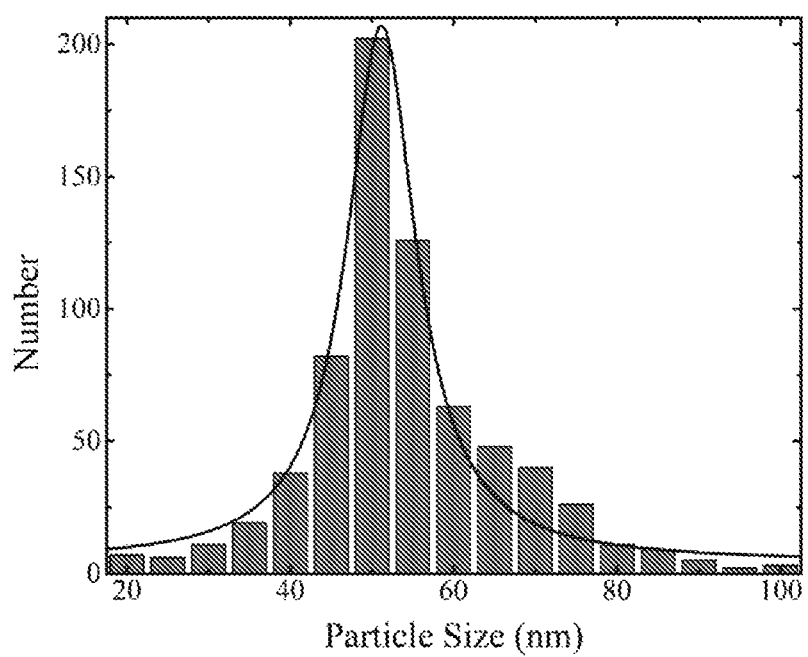
FIG. 5 illustrates the size distribution of the produced silica nanoparticles. The statistics were conducted over 698 nanoparticles.
Figure 6A:
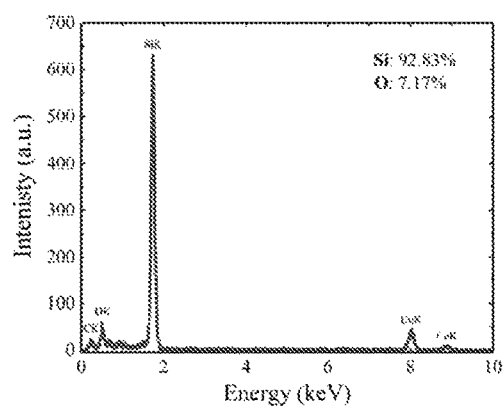
FIGS. 6A-B provide EDX analysis (top) and elemental mapping (bottom) acquired in conjunction with the HRTEM images before (FIG. 6A) and after the combustion (FIG. 6B). Red (darker region) is silicon and green (lighter region) is oxygen.
Figure 6B:
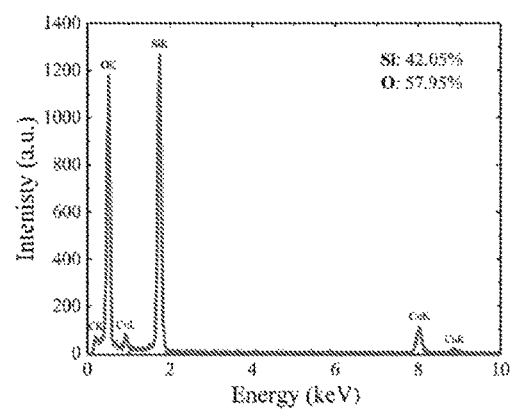
Figure 7:
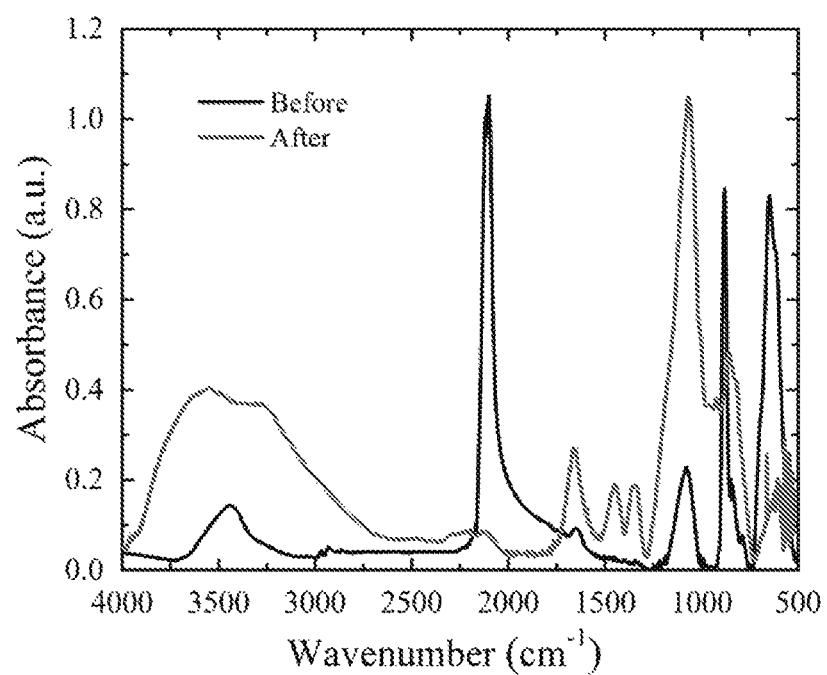
FIG. 7 shows infrared spectra before (black) and after (red) the reaction. Notice the disappearance of the peak at 2100 $cm^{-1}$ representative of Si—H stretching mode and the peak at 640 $cm^{-1}$ representative of Si—H wagging mode. This correlates well with the production of silica nanoparticles.

This robust explosive reaction produced perfectly spherical non-aggregated silica ($SiO_2$) nanoparticles (see FIGS. 4A-B). The particle size is about 20 nm to 100 nm and the mean value is about 50 nm (see FIG. 5). However, the particle size (diameter) can be controlled by controlling the amount of oxygen present during the reaction. The energy-dispersive X-ray spectroscopy (EDX) as well as the elemental mapping conducted before and after the interaction indicates the encountered high degree of oxidation although the reaction was conducted in a low-oxygen content environment (see FIGS. 6A-B). The infrared spectra (FT-IR) in FIG. 7 also show how the combustion oxidized the sample as a result of production of silica nanoparticles.

Figure 8:
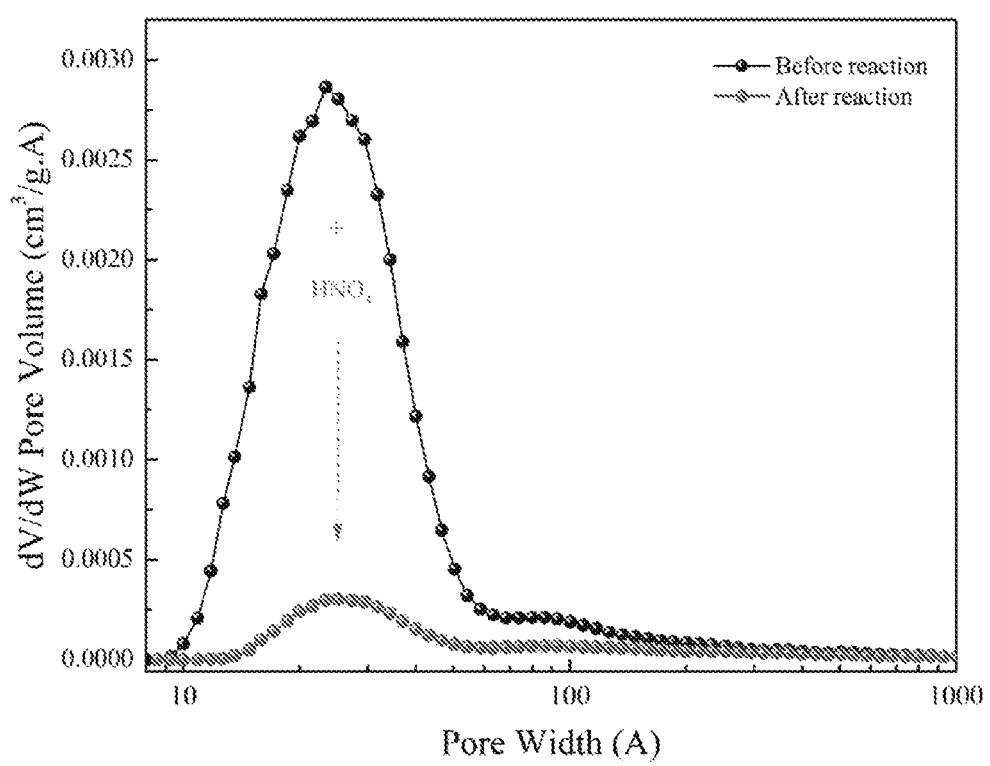
FIG. 8 compares pore volume vs. pore width spectra before (black) and after (red, lower curve) adding the nitric acid to the amorphous porous silicon nanoparticles. These results shows how the porosity reduced by more than 10 times as a result of the explosive reaction. This correlates well with the obtained highly compacted spherical silica nanoparticles as shown in the TEM images.

FIG. 8 shows the effect of the reaction on the porosity. The porosity of the mesoporous structure was reduced by about 10 times or more as a result of the explosive-reaction. This correlates well with the compact structure of the obtained spherical silica nanoparticles.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'". When a range includes "zero" and is modified by "about" (e.g., about one to zero or about zero to one), about zero can include, 0, 0.1, 0.01, or 0.001.

While only a few embodiments of the present disclosure have been shown and described herein, it will become apparent to those skilled in the art that various modifications and changes can be made in the present disclosure without departing from the spirit and scope of the present disclosure. All such modification and changes coming within the scope of the appended claims are intended to be carried out thereby.

We claim at least the following:

1. A method of making silica particles, comprising:
   mixing nitric acid with porous silicon particles in an environment, wherein the porous silicon particles are irregularly shaped; and
   forming spherical non-aggregated silica particles.

2. The method of claim 1, wherein the spherical non-aggregated silica particles are mesoporous.

3. The method of claim 1, wherein the porous silicon particles are amorphous.

4. The method of claim 1, further comprising:
   removing a layer of porous silicon from a substrate using a first ultrasound energy to form a first plurality of colloidal porous silicon particles in suspension;
   exposing the first plurality of porous silicon particles to a second ultrasound energy to form a second plurality of porous silicon particles in suspension, wherein the second plurality of colloidal porous silicon particles are in the amorphous phase; and
   drying the porous silicon particles.

5. The method of claim 4, wherein the layer of porous silicon on the substrate is about 1 to 10 μm thick.

6. The method of claim 4, wherein a power of the first ultrasound energy ranges from about 60 W to about 240 W.

7. The method of claim 4, wherein a power of the second ultrasound energy ranges from about 50 W to about 500 W.

8. The method of claim 4, wherein the layer of porous silicon is modified or doped.

9. The method of claim 4, wherein the layer of porous silicon is mesoporous.

10. The method of claim 4, wherein the layer of porous silicon is macroporous.

11. The method of claim 4, wherein the layer of porous silicon is nanoporous.

12. The method of claim 1, further comprising: controlling the oxygen content in the environment when mixing the nitric acid with the porous silicon particles.

13. The method of claim 12, wherein the oxygen content in the environment is controlled to be up to about 0.5-2.0 ppm of oxygen.

14. The method of claim 1, wherein the spherical non-aggregated silica particles are spherical non-aggregated silica nanoparticles having a diameter of about 20 to 100 nm.

15. The method of claim 1, wherein the porous silicon particles and the nitric acid are present in a weight ratio of 10000:1 to 5000:1.

16. The method of claim 1, wherein the porous silicon particles have a longest dimension of about 100 nm to about 1 μm.

* * * * *